(12) United States Patent
Evans

(10) Patent No.: US 7,308,506 B1
(45) Date of Patent: Dec. 11, 2007

(54) METHOD AND APPARATUS FOR PROCESSING DATA TRAFFIC ACROSS A DATA COMMUNICATION NETWORK

(75) Inventor: Alun Christopher Evans, London (GB)

(73) Assignee: Cisco Technology, Inc., San Jose, CA (US)

( * ) Notice: Subject to any disclaimer, the term of this patent is extended or adjusted under 35 U.S.C. 154(b) by 903 days.

(21) Appl. No.: 10/342,606

(22) Filed: Jan. 14, 2003

(51) Int. Cl.
*G06F 15/16* (2006.01)

(52) U.S. Cl. ............... 709/245; 709/227; 709/238; 709/241; 370/254; 370/338; 370/401

(58) Field of Classification Search .............. 709/203, 709/238, 245, 227, 241; 370/401, 254, 338
See application file for complete search history.

(56) References Cited

U.S. PATENT DOCUMENTS

| | | | |
|---|---|---|---|
| 5,243,592 A | 9/1993 | Perlman et al. | |
| 5,253,248 A | 10/1993 | Dravida et al. | |
| 5,999,286 A | 12/1999 | Venkatesan | |
| 6,148,410 A | 11/2000 | Basket et al. | |
| 6,243,754 B1 | 6/2001 | Guerin et al. | |
| 6,389,764 B1 | 5/2002 | Stubler et al. | |
| 6,535,481 B1 | 3/2003 | Andersson et al. | |
| 6,578,085 B1 * | 6/2003 | Khalil et al. | 709/241 |
| 6,668,282 B1 | 12/2003 | Booth et al. | |
| 6,684,256 B1 * | 1/2004 | Warrier et al. | 709/238 |
| 6,829,215 B2 | 12/2004 | Tornar | |
| 6,892,069 B1 * | 5/2005 | Flynn | 370/405 |
| 6,957,262 B2 * | 10/2005 | Kimura et al. | 709/227 |
| 7,116,654 B2 * | 10/2006 | Kim | 370/338 |
| 2002/0093954 A1 | 7/2002 | Weil et al. | |
| 2004/0057384 A1 * | 3/2004 | Le et al. | 370/252 |
| 2004/0095913 A1 * | 5/2004 | Westphal | 370/401 |
| 2004/0117251 A1 | 6/2004 | Charles Shand | |
| 2006/0133337 A1 * | 6/2006 | An et al. | 370/338 |
| 2006/0182083 A1 * | 8/2006 | Nakata et al. | 370/401 |

OTHER PUBLICATIONS

Myles et al., "A Mobile Host Protocol Supporting Route Optimization and Authentication", Jun. 1995, IEEE, IEEE Journal on Selected Areas in Communications, special issue on "Mobile and Wirteless Computing" 13(5):839-849.*

Wang, Zheng et al., "Shortest Path First with Emergency Exits," ACM 089791-405-8/90/0009/0166, 1990, pp. 166-176.

M. Watari, "Masafumi Watari's Web Site," "Papers" page, printed May 7, 2003, http://www.sfc.wide.ad.jp/~watari/papers.html, 1 page.

(Continued)

*Primary Examiner*—Ario Etienne
*Assistant Examiner*—Ramy M Osman
(74) *Attorney, Agent, or Firm*—Hickman Palermo Truong & Becker LLP

(57) ABSTRACT

A method is presented for processing data traffic between a correspondent node and a mobile node on the data communication network. Traffic from the correspondent node to the mobile node is intercepted and the mobile node home address is replaced as destination with the mobile node attachment address. Traffic from the mobile node to the correspondent node is intercepted and the attachment address is replaced as source with the home address.

40 Claims, 11 Drawing Sheets

OTHER PUBLICATIONS

C. Perkins, "IP Mobility Support for IPv4," Jan. 2002, IETF Network Working Group Request for Comments 3220 (RFC 322), from www.ietf.org, pp. 1-98.

S. Deering, et al., "Internet Protocol, Version 6 (IPv6), Specification," Dec. 1998, IETF Network Working Group Request for Comments 2460, from www.ietf.org, pp. 1-39.

University of Southern California, Information Sciences Institute, "Internet Protocol, Darpa Internet Program, Protocol Specification," Sep. 1981 (IETF RFC 791), 48 pages.

D. Johnson, et al., "Mobility Support in Ipv6, draft-ietf-mobileip-ipv6-21.txt," Feb. 26, 2003, http://www.ietf.org/html.charters/mobileip-charter.html, pp. 1-169.

Ryuji Wakikawa, et al., "Mobility Related Research at the InternetCAR Project," http://www.connectathon.org/talks03/cthon-keio.pdf, Mar. 5, 2003, 12 pages.

William Stallings, "Mobile IP," http://www.cisco.com/warp/public/ipi_4-2_ip.html, 11 pages.

Cisco Systems, Inc., "White Paper, *Cisco Mobile IP*, Executive Summary," 2002, http://www.cisco.com/warp/public/cc/pd/10sw/prodlit/mbxul_wp.htm, 8 pages.

Cisco Systems, Inc., "Configuring Mobile IP," http://www.cisco.com/warp/public/732/Tech/mobile/IP/techdocument, 2003, 38 pages.

International Searching Authority, International Search Report, PCT/US04/33827, dated Mar. 28, 2005, 8 pages.

Current Claims, PCT/US04/33827, 6 pages, Oct. 13, 2004.

* cited by examiner

METHOD AND APPARATUS FOR PROCESSING DATA TRAFFIC ACROSS A DATA COMMUNICATION NETWORK

FIELD OF THE INVENTION

The present invention generally relates to a method and apparatus for processing data traffic. The invention relates more specifically to a method and apparatus for processing data traffic across a data communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it according to one of various routing protocols).

Referring to FIG. 1 which shows a block diagram illustrating an overview of a data communication network, the network is designated generally 10 and includes a network of nodes and links shown by "cloud" 12 with routers 14, 16, 18. The routers 14, 16, 18 are connected to routers, servers or clients (only one is shown for each router in FIG. 1 but multiple routers, servers or clients can of course be supported) providing access to the Internet. Referring to FIG. 1 a local access router 20 connected to the router 14 comprises a Home Agent (HA), a foreign access router (FA) 22 is connected to router 16 and a server 24 is connected to the router 18 and comprises a Correspondent Node (CN). Communication between the routers 20, 22 and server 24 is possible across the Internet. In this description the local access router 20 is also termed a Home Agent 20 and the server 24 is also termed a Correspondent Node 24.

One issue of increasing importance as regards data communications networks relates to processing data traffic involving a mobile node. For example referring to FIG. 1 a Mobile Node 26 (MN) comprising a laptop computer is connected to the home agent 20. When it is desired to communicate between the mobile node 26 and the correspondent node 24 this is straightforward while the mobile node is connected to its home agent. The manner in which communication is carried out is dependent upon the communication protocol adopted but prevalent protocols are Internet Protocol version 4 (IPv4) and version 6 (IPv6) which are described at the time of this writing in the files "rfc791.txt" and "rfc2460.txt" respectively in directory "rfc" of the domain "ietf.org" on the World Wide Web. In particular a mobile node has a home address (at its home agent) such that while it is connected to its home agent it uses its home address as source address and the correspondent node can reply simply by using the mobile node's home address as the destination address allowing straightforward communication according to the protocol. However if the mobile node 26 moves to a position as shown in dotted lines in FIG. 1 and connects to foreign access router 22 then evidently the mobile node's home address will not be sufficient for communication with the correspondent node 24 to be continued.

One existing solution to deal with this is to assign the mobile node 26 an attachment address or "care of address" when it attaches to a foreign access router 22. The mobile node establishes whether it is connected to the home agent 20 or to a foreign access router 22 by receiving and processing a "Router Advertisement" from the entity to which it is connected which will include information about the subnet that it is connected to, in order for the MN to build a care of address. If the MN is at home then the agent address is also included within this information. When the mobile node 26 detects that it is at a foreign access router 22 then to find its Home Agent it sends a Dynamic Home Agent Address Discovery (DHAAD) request packet and awaits a DHAAD reply. It then sends a "binding update" (BU) message to the home agent 20 via the foreign access router 22 using its new care of address as the source address, and including a home address option as discussed in more detail below. The home agent 20 uses the binding update message to update its "binding cache" of addresses with the care of address. The binding cache is a table maintained by the home agent 20 of all mobile nodes 26 which are away from home at a foreign access router. The table maps the mobile node's home address to the care of address that it is currently using. If there is not an entry in the table for the given home address, then it is assumed that the mobile node is on the home network. In practice additional authentication steps may take place which are facilitated because the mobile node 26 and its home agent 20 are in a common security regime.

The procedure when a correspondent node 24 corresponds with a mobile node 26 which is not connected to the home agent 20 is shown in FIG. 2 which depicts a network diagram illustrating one known solution to communication between a mobile node and a correspondent node. Because the correspondent node and mobile node are not in the same security domain they cannot simply authenticate each other. Accordingly the correspondent node 24 sends a packet to the mobile node's home address, i.e. the home agent 20 along a link 25 joining the two. The home agent 20 establishes from its binding cache the current care of address of the mobile node 26 and forwards the packet along a link 27 to the mobile node 26 via the foreign access router 22 to which the mobile node 26 is currently attached. If the mobile node 26 replies then the message is once again channeled via the home agent 20. For the purposes of security or transparency the home agent 20 tunnels the packets between the correspondent node 24 and mobile node 26, i.e. encapsulates data packets received from one party in a larger packet destined for the other party, with or without encrypting the original data packets. There is no direct communication, therefore, between the mobile node 26 and the correspondent node 24 which can introduce delays in communication. This approach, known as "dogleg routing" provides a level of transparency for the correspondent node upper layer protocols (i.e. at the level of determining source and destination values for packets).

Improved solutions are disclosed in internet protocol versions 4 and 6 in relation to mobility support (mobile IPv4/IPv6) as set out at the time of this writing in the file "rfc3220.txt" in directory "rfc" and in the file "draft-ietf-mobileip-ipv6-19.txt" in directory "internet drafts" respectively of the domain "ietf.org" on the World Wide Web. In particular "Mobility Support in IPv6" uses the technique of "return routability". Referring to FIG. 3, which shows a network diagram illustrating a further known solution to communication between a mobile node and a correspondent node, as with the previous solution, the mobile node 26 sends a binding update to the home agent 20 along the link 27 such that the home agent 20 maintains an updated binding cache. On initiation or maintenance of a communication path or link between a mobile node 26 and a correspondent node 24, the mobile node 26 simultaneously sends two different authentication packets to the correspondent node 24.

The first packet is sent using its home address as source, such that the packet must travel via the home agent 20. Therefore the mobile node encrypts and reverse tunnels the packet to the home agent 20 along link 27. The home agent decrypts and decapsulates the packet, and forwards it along link 25 to the correspondent node 24. The encrypted tunnel ensures that the packet can only be seen along link 25.

The second packet is sent using its-care-of-address as the source, thus the packet can be sent directly to the correspondent node 24 via link 28.

On receiving each packet the correspondent node 24 sends a response back to the mobile node 26, using the source address of the first packet as the destination address. Thus the first packet is destined for the home address, and travels along link 25 until the home agent 20 intercepts, encrypts and tunnels it via link 27 to the mobile node 26.

The correspondent node also sends a response packet destined for the care of address, which travels direct via link 28.

Using these two packets, the mobile node 26 can build a common secret which only it and the correspondent node 24 shares, providing return routability. As a result route optimisation can be performed. Thus the mobile node can now send an authenticated BU to the CN, and the mobile node 26 and correspondent node 24 can communicate directly along the link 28. Each time the mobile node 26 moves, once the link 28 has been set up direct communication can continue.

However a disadvantage of this approach is that the correspondent node, as it now deals directly with the mobile node's care of address, has to maintain a binding cache and also carry out route optimisation including return routability authentication steps. This is a significant burden both on the correspondent node memory and processing capabilities which can divert resources from its core server functionality. This can render a server particularly vulnerable to a denial of service attack wherein the multiple route optimisation operations are instigated by a malicious third party.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for processing data traffic across a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview 2.0 Structural and Functional Overview 3.0 Method of Processing Data Traffic Across a Data Communication Network 4.0 Implementation Mechanisms-Hardware Overview 5.0 Extensions and Alternatives 1.0 General Overview The needs identified in the foregoing Background, and other needs and objects that will become apparent for the following description, are achieved in the present invention, which comprises, in one aspect, a method for processing data traffic across a data communications network. The traffic is between a correspondent node and a mobile node. The mobile node is attachable to a plurality of points on the network and has a home address and an attachment address. Traffic from the correspondent node to the mobile node is intercepted, and the home address, which appears as the destination address in such traffic, is replaced with the attachment address. The method also comprises the step of intercepting traffic from the mobile node to the correspondent node and replacing the attachment address as source address with the home address.

As a result the packets that are then sent to the correspondent node appear as though they have come from the mobile node's home address, and the correspondent node can return packets to the home address as destination address. At the point of interception, the destination address is replaced with the attachment address. Accordingly the mobile node point of attachment is transparent to the correspondent node as all of the mobility options are dealt with at the point of interception such that the correspondent node can operate under its normal protocol without the processing and memory burden introduced by mobility options.

In other aspects, the invention encompasses a computer apparatus and a computer-readable medium configured to carry out the foregoing steps.

2.0 Structural and Functional Overview

In the implementation discussed herein as an example, the method is described in conjunction with mobile IPv6 but it will be appreciated that the method extends to any appropriate protocol supporting mobility options. In order to understand implementation of the method it is helpful first to review some aspects of mobile IPv6. The skilled person will be well aware of the operation of IPv6 and so only an overview is required here.

Figure 1:
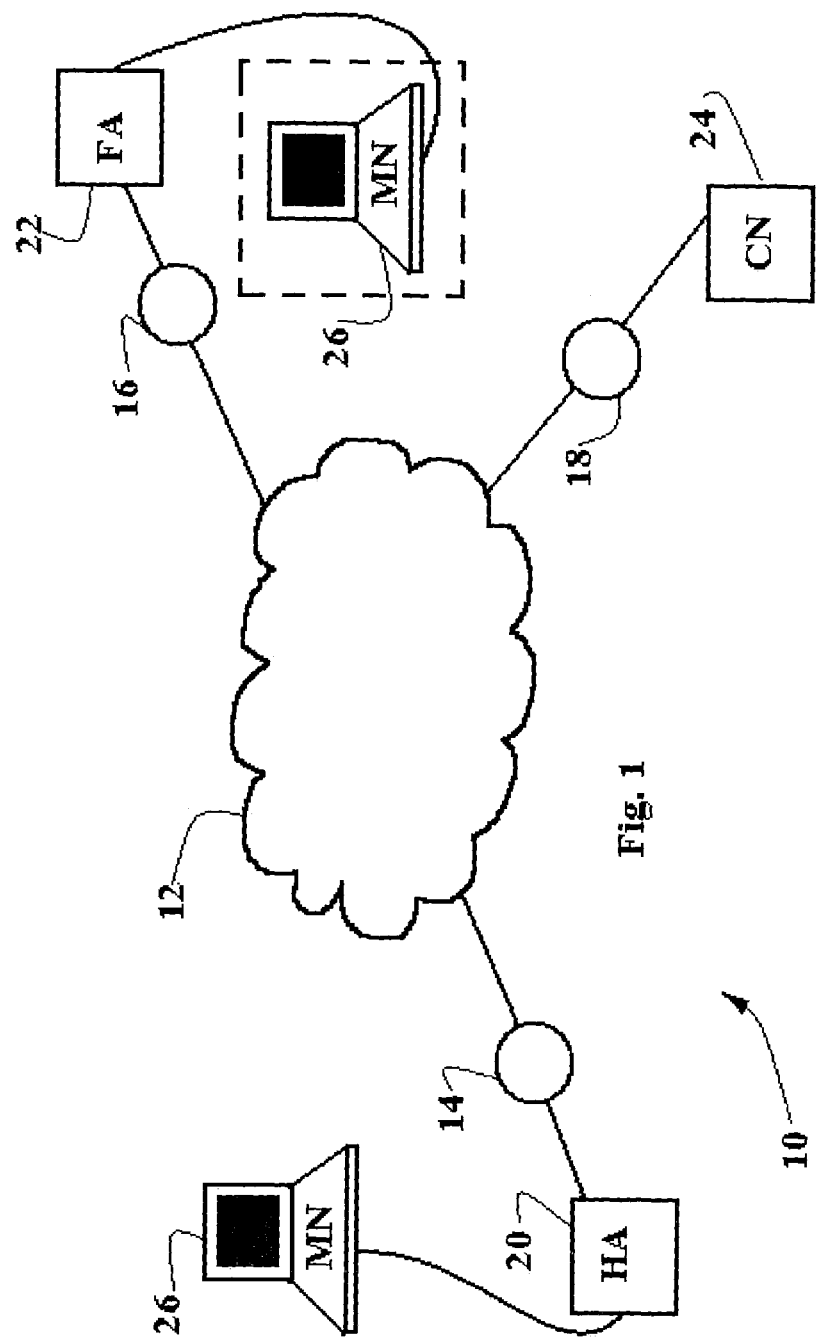
FIG. 1 is a block diagram that illustrates an overview of a data communication network.
Figure 2:
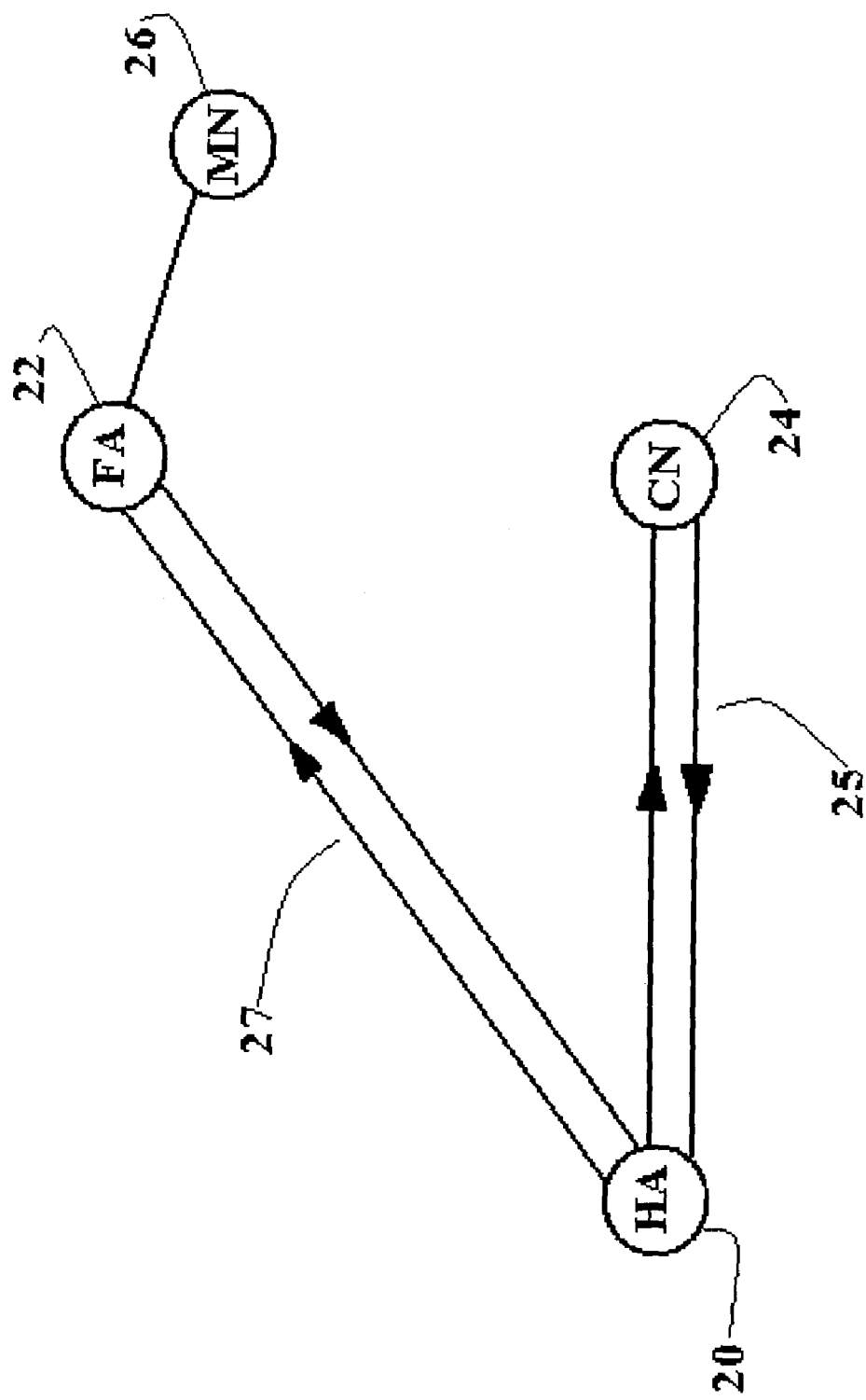
FIG. 2 is a network diagram that illustrates one known solution to communication between a mobile node and a correspondent node.
Figure 3:
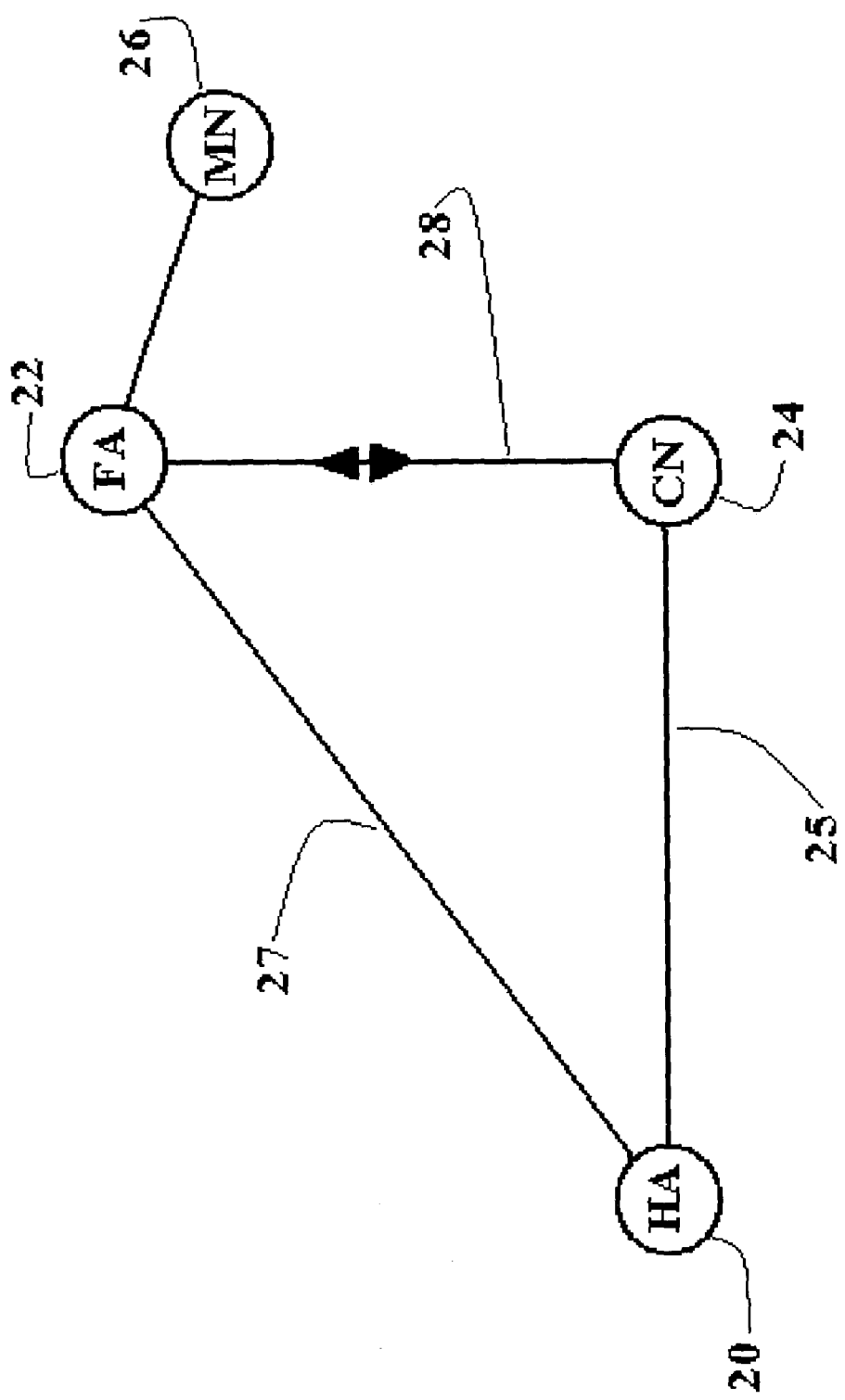
FIG. 3 is a network diagram that illustrates a further known solution to communication between a mobile node and a correspondent node.
Figure 4:
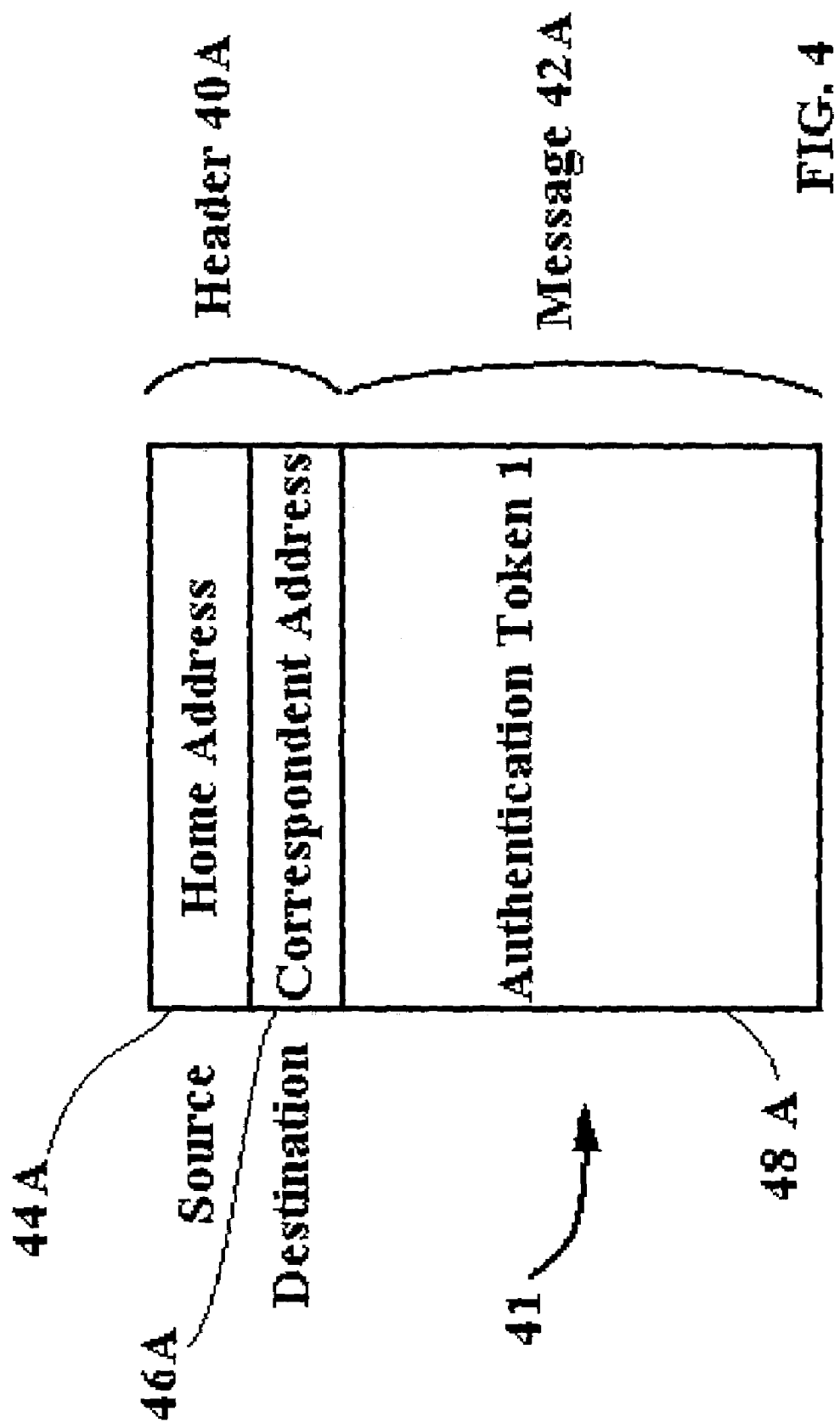
FIG. 4 shows a HoTI message initiating correspondence between a mobile node and a correspondent node.
Figure 5:
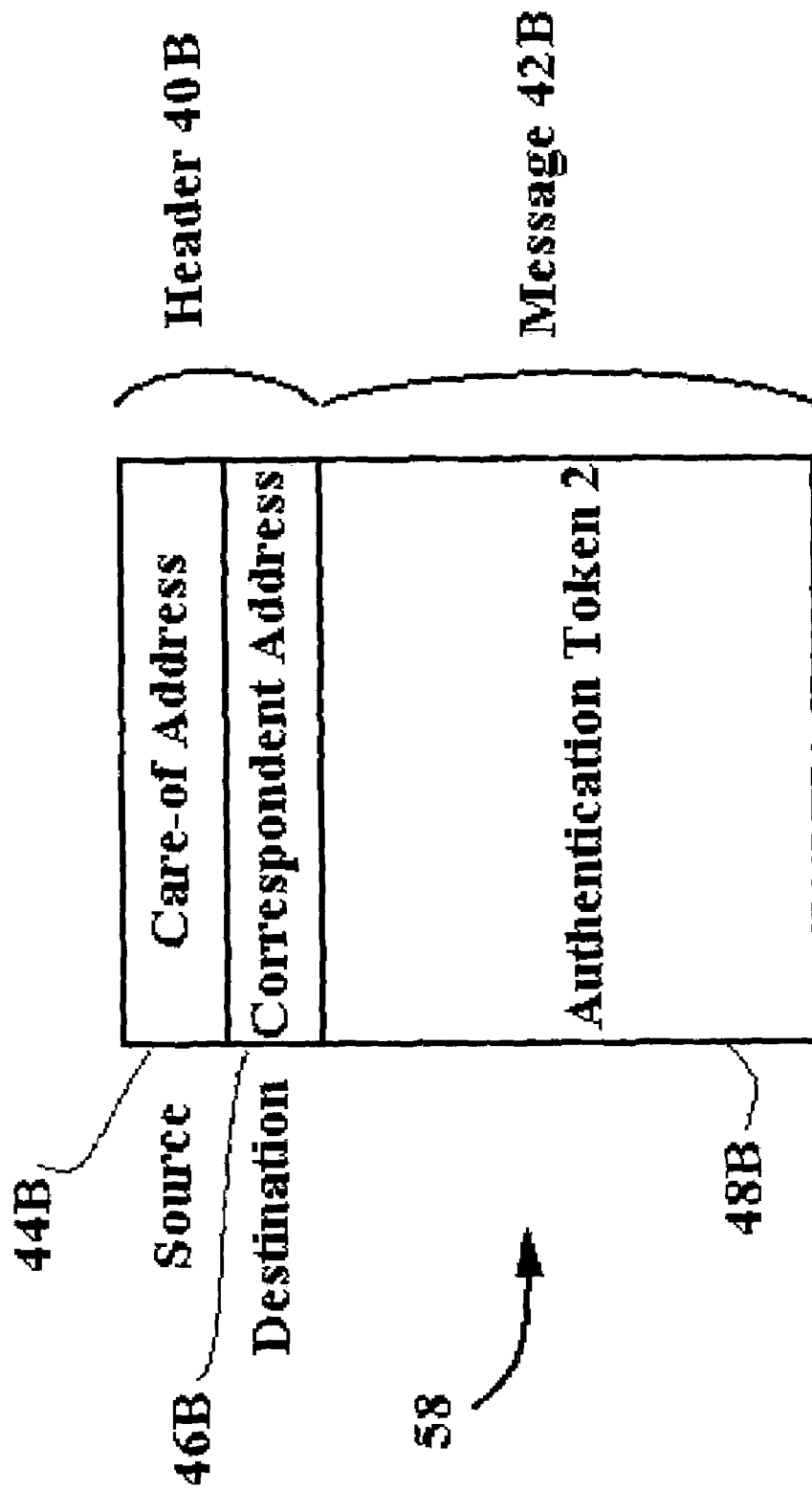
FIG. 5 shows a CoTI message initiating correspondence between a mobile node and a correspondent node

Referring once again to the basic structure shown in FIG. 2 and FIG. 3 which illustrate known solutions to communication between a mobile node and a correspondent node, when a mobile node 26 wants to initiate communication with a correspondent node 24 the mobile node issues a home test initiation ("init") (HoTI) message of the form generally shown in FIG. 4 which shows a HoTI packet initiating correspondence between a mobile node and a correspondent node. The packet 41 comprises a packet header 40A having a source field 44A and a destination field 46A and a message data field 42A. The HoTI packet 41 includes the mobile node's home address as source address in the source field 44A and the correspondent address as destination address in the destination field 46A as well as a first authentication token 48A as part of the message data 42A. The HoTI packet 41 is sent via an encrypted reversed tunnel to the home agent 20. At the same time the mobile node 26 sends a care-of test init (CoTI) message directly to the correspondent node 24 having the mobile node's care-of address as source address and the correspondent node's address as destination address. FIG. 5 shows a CoTI message 58 initiating correspondence between a mobile node and a correspondent node. CoTI message 58 comprises a header 40B having the mobile node's care-of address in source field 44B and the correspondent node's address in destination address field 46B. The message data 42B includes a second authentication token 48B.

Figure 6:
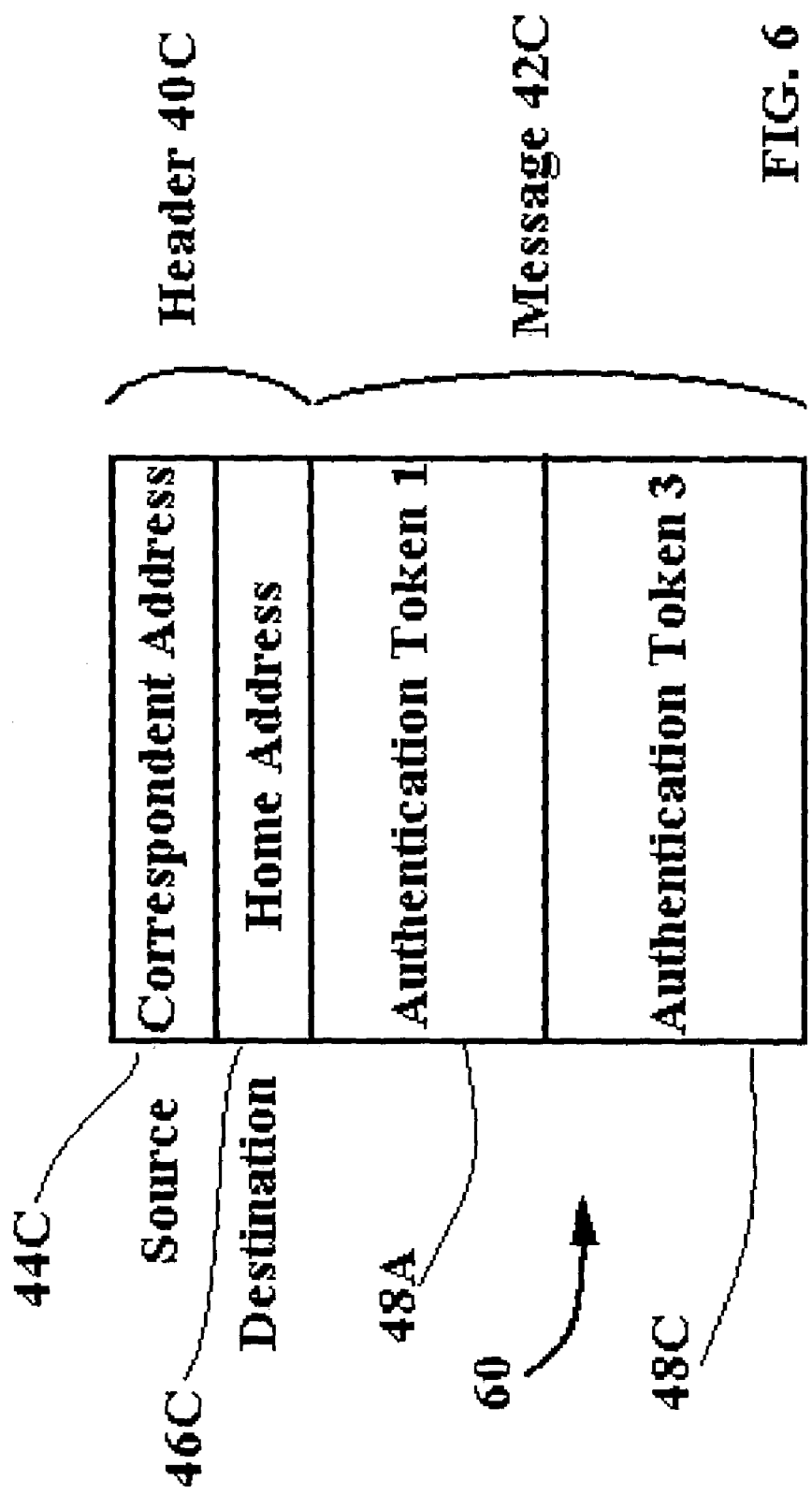
FIG. 6 shows a HoT message comprising a correspondent node response to correspondence initiation.

The HoTI packet 41 is decapsulated by the home agent 20 and forwarded to the correspondent node 24 which then sends a home test (HoT) message to the mobile node. FIG. 6 shows a HoT message 60 comprising a correspondent node response to correspondence initiation. In header 40C of HoT message 60, the source address field 44C is set to the correspondent address and the destination address field 46C is set to the home address of the mobile node and the message returns the first authentication token 48A as well as a third authentication token 48C in message data 42C. The home agent 20 intercepts the HoT message 60, encrypts it, and tunnels it to the mobile node 26.

Figure 7:
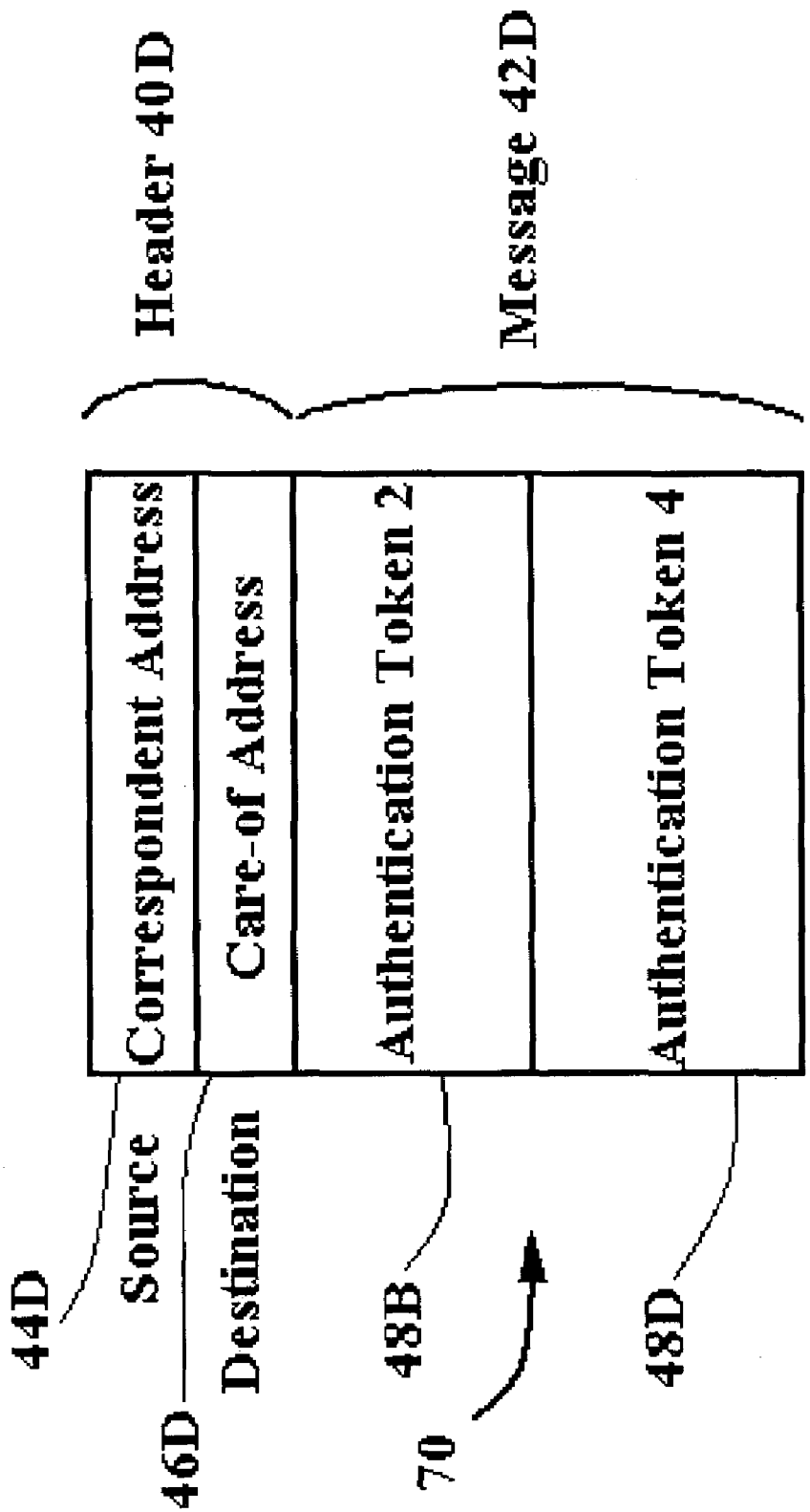
FIG. 7 shows a CoT message comprising a correspondent node response to correspondence initiation.

On receiving the CoTI message 58, the correspondent node 24 sends a care-of test (CoT) message direct to the mobile node 26. FIG. 7 shows a CoT message 70 comprising a correspondent node response to correspondence initiation. CoT message 70 includes the address of the correspondent node 24 in source address field 44D and the care-of address of the mobile node 26 in destination address field 46D. Message data 42D returns the first authentication token 48B as well as a fourth authentication token 48D.

The mobile node 26 now has enough information to construct an authenticator which it sends with a binding update to the correspondent node 24 with the source address set to the care-of address of the mobile node and the destination address set to the correspondent nodes' address. The correspondent node sends a binding acknowledgement message and updates its binding cache with the relevant information.

It will be noted that mobile IPv6 supports additional fields, in particular a home address option which is included within the binding update, which the correspondent node 24 uses as the index to the binding cache. Where this option is exercised in a packet sent from the mobile node 26 with a source address as its care-of address, the home address option field carries the mobile node's home address. As a result a correspondent node 24 receiving the packet can substitute the mobile node's home address for the care-of address when processing the packet, making the mobility of the mobile node 26 transparent to the correspondent node 24. In the above identified exchange this option is not exercised during the return routability exchange.

It will further be seen that there are three possible changes of state which need to be embraced within the route optimisation option. The first of these is where a mobile node 26 at a foreign access router 22 initiates correspondence with a correspondent node 24 in which case the steps set out above are followed. If a correspondent node 24 wishes to initiate correspondence then it will first communicate with the home agent 20 which will forward packets to the mobile node 26 based on its binding cache. In this case the mobile node 26 can detect that return routability could be initiated with the correspondent node 24 and can initiate the procedure described above. The third option is that the mobile node 26, which is already in correspondence with the correspondent node 24 moves its attachment point in which case, once again it will carry out route optimisation to establish a new return route following the steps described above.

The method described herein adopts many features of the route optimisation procedure described above but in particular shifts the burden from the correspondent node 24 to a node intermediate to the correspondent node 24 and the mobile node 26, in the example described, the next hop router 18 to the correspondent node 24, which can be viewed as a pseudo correspondent node.

Figure 8:
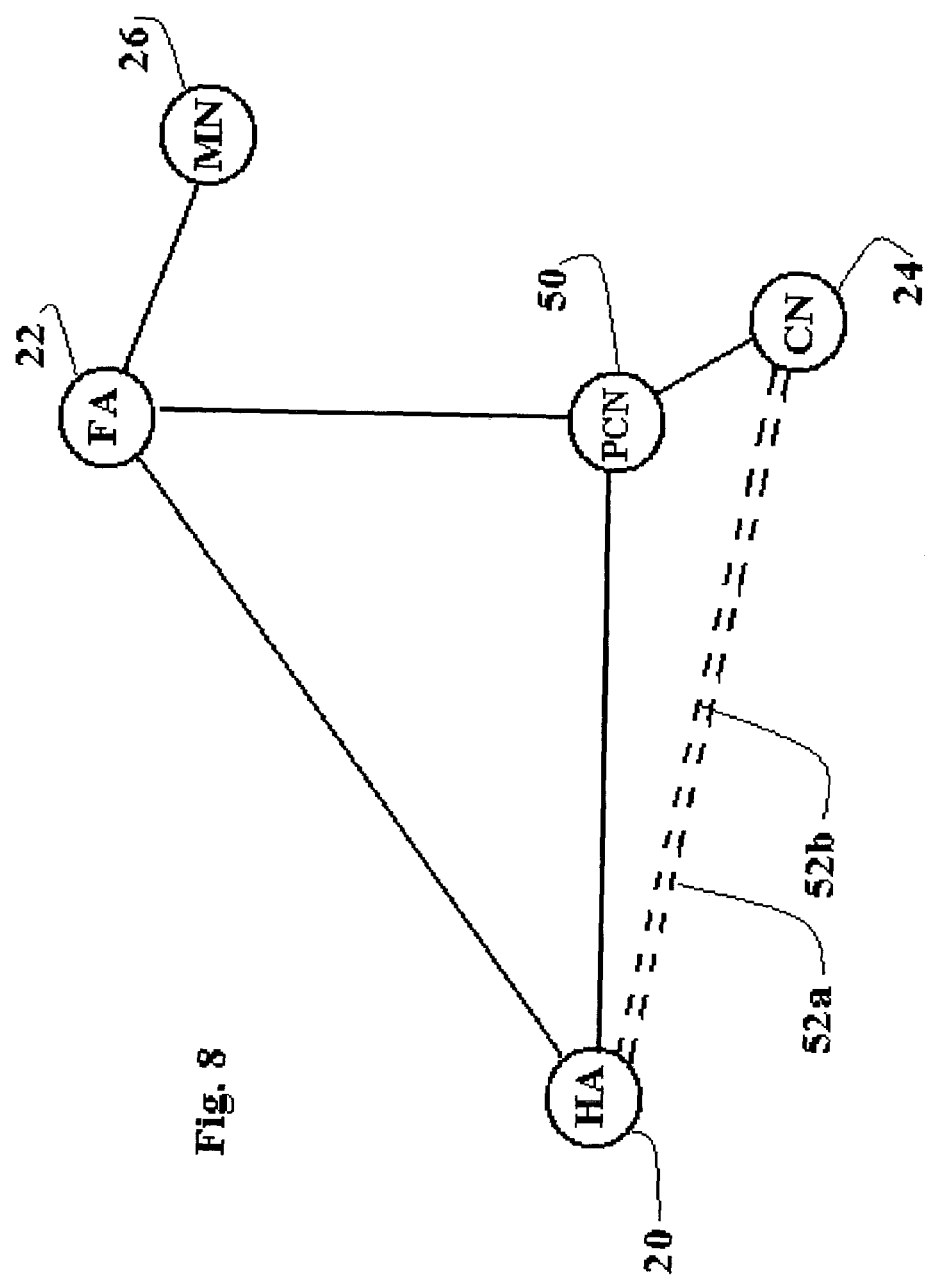
FIG. 8 is a network diagram showing a pseudo correspondent node communicating with the correspondent node.

FIG. 8 shows such an arrangement, depicting a network diagram showing a pseudo correspondent node communicating with a correspondent node. The pseudo correspondent node 50 (PCN) is shown as a last hop router to the correspondent node 24. The pseudo correspondent node 50 intercepts traffic between the mobile node 26 and the correspondent node 24 and strips the mobile options (for example the home address option) when transferring packets to the correspondent node 24 and inserts them when transferring packets from the correspondent node 24. The pseudo correspondent node 50 further maintains the binding cache on behalf of the correspondent node 24 (and indeed any other correspondent nodes 24 for which it is acting as a pseudo correspondent node).

As discussed in more detail below the interception step is carried out by identifying traffic to the correspondent node 24 and examining it for mobility options, and also identifying traffic from a correspondent node 24 which has an entry on the binding cache (implying that it is in correspondence with a mobile node 26). The pseudo correspondent node 50 alters either the source or destination addresses, or both, based on the binding cache entries such that the mobility of the mobile node 26 is transparent to the correspondent node 24. The pseudo correspondent node 50 also carries out the steps of route optimisation on behalf of the correspondent node 24. As a result the correspondent node 24 believes that it is communicating effectively directly with the mobile node via its Home Agent 20 irrespective of the mobile node's actual location, as designated by virtual communication paths 52a and 52b in FIG. 8. The burden of dealing with the authentication steps and other requirements of route optimisation and of constructing and maintaining a binding cache is transferred from the correspondent node server to the pseudo correspondent node router 50 where the required memory and packet processing capability are better suited to these tasks, rendering a denial of service attack less viable.

Figure 10:
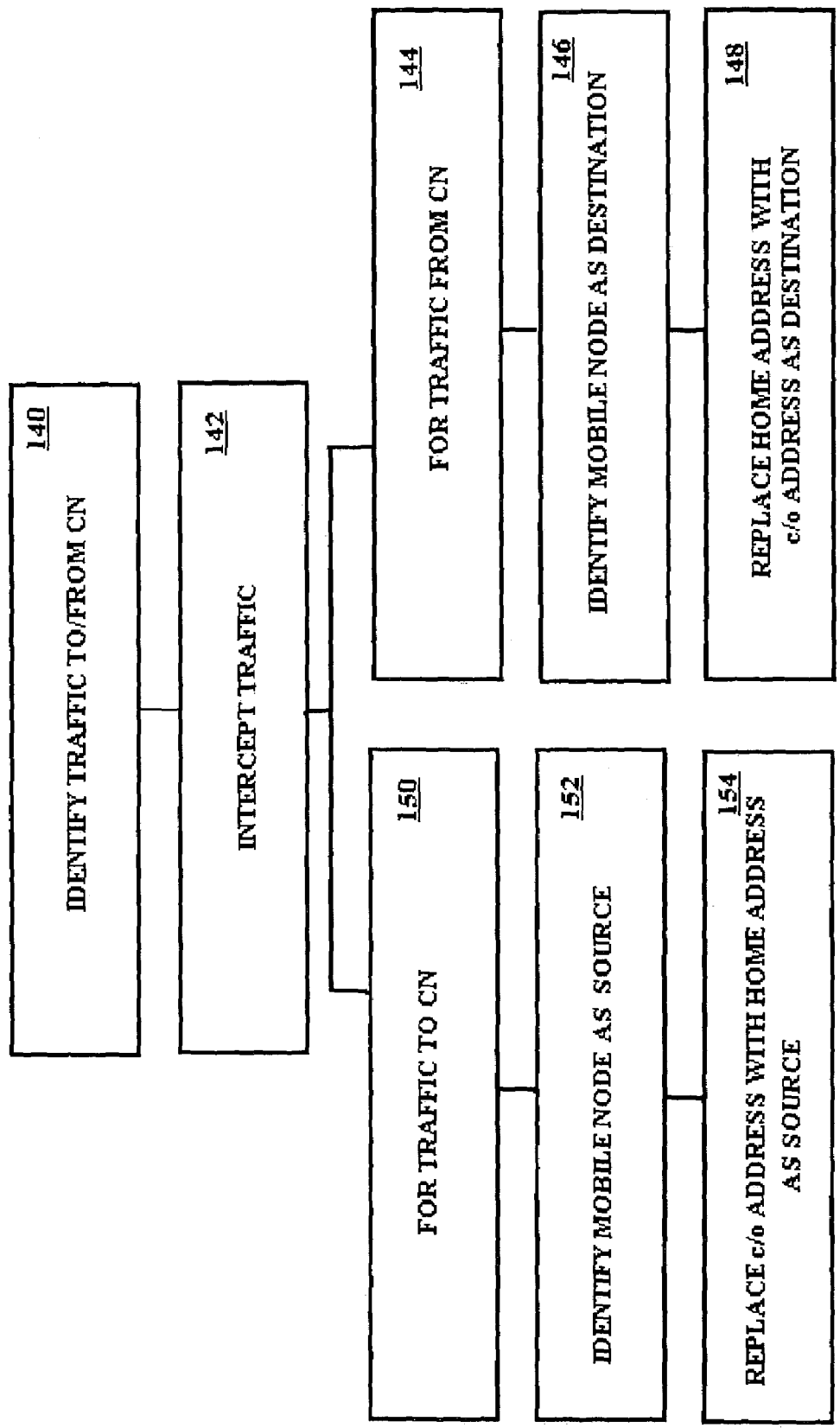
FIG. 10 is a flow diagram illustrating a high level view of a method for processing data traffic.

FIG. 10 is a flow diagram illustrating a high level view of a method of processing data traffic. In block 140 the pseudo correspondent node 50 identifies traffic that is to or from the correspondent node. In block 142 the pseudo correspondent node 50 intercepts at traffic. The following steps are then dependent on the traffic type.

At block 144 the pseudo correspondent node 50 identifies traffic from the correspondent node. At block 146 pseudo correspondent node 50 identifies a mobile node as destination and in block 148 the pseudo correspondent node replaces the home address of the mobile node with the care of address as destination.

At block 150 the pseudo correspondent node 50 identifies traffic destined for the correspondent node. In block 152 the pseudo correspondent node 50 identifies any traffic originating from a mobile node and at block 154 the pseudo correspondent node 50 replaces the mobile node care of address with its home address as source address.

3.0 Method of Processing Data Traffic Across a Data Communication Network

Figure 11:
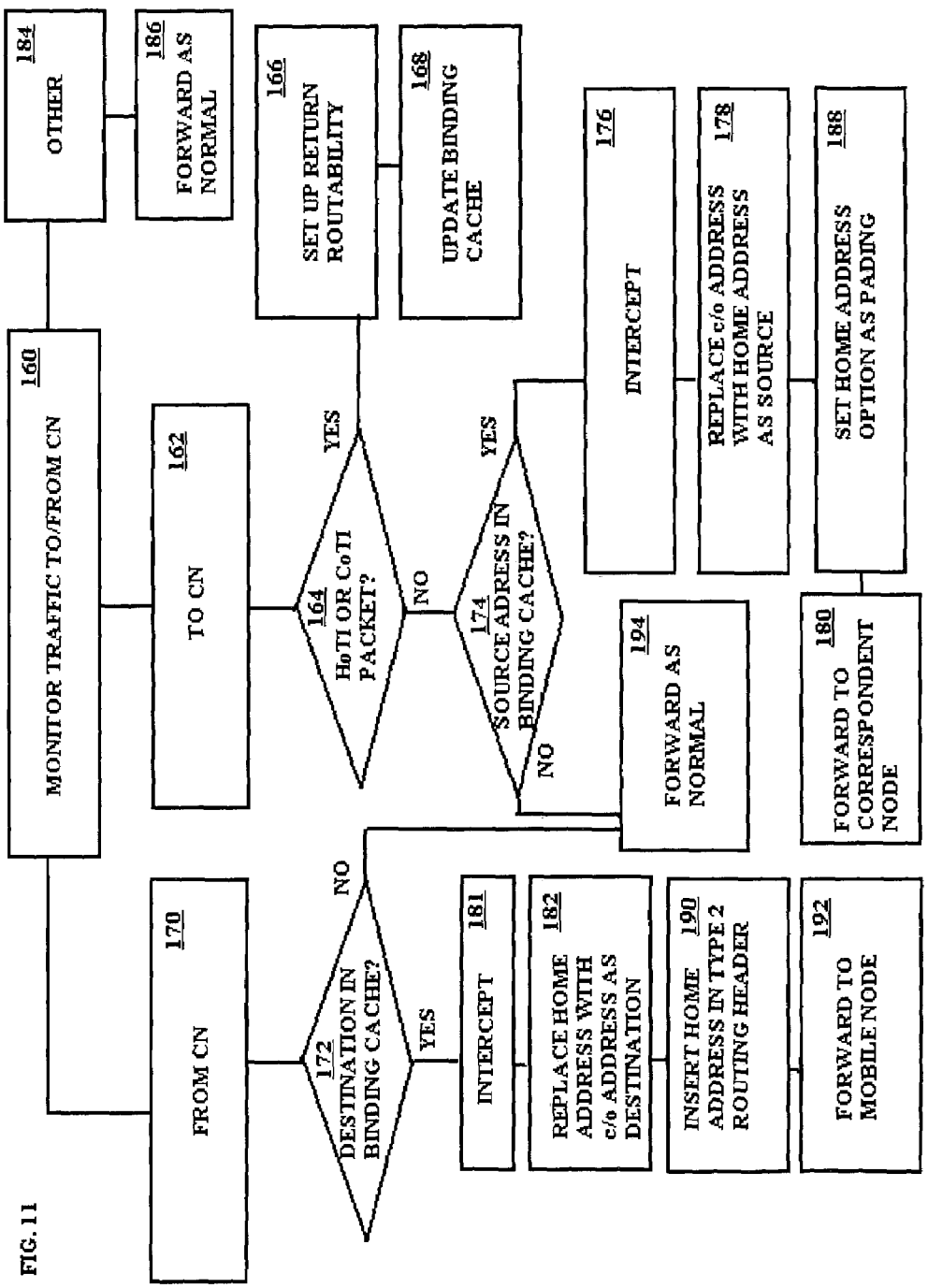
FIG. 11 is a flow diagram illustrating in more detail a method for processing data traffic.

FIG. 11 is a flow diagram illustrating in more detail a method for processing data traffic. As discussed above, there are three possible options for instigation of a direct path between a correspondent node 24 and a mobile node 26, but in all cases the mobile node 26 effectively initiates return routability, i.e. authenticating the direct path. Accordingly as shown in blocks 160 and 162 of FIG. 11, the pseudo correspondent node 50 in FIG. 8 first of all monitors all data traffic with destination address as any correspondent node 24 for which it acts as pseudo correspondent node. When the pseudo correspondent node 50 detects such a packet, the pseudo correspondent node then establishes whether it originates from a mobile node 26. For a mobile node initiating correspondence, this step is achieved by establishing whether a packet is a HoTI or a CoTI packet in block 164. During the initiation exchange (HoTI, CoTI) the pseudo correspondent node 50 acts in block 166 exactly as the correspondent node 24 would have in sending return HoT and CoT messages, updating its binding cache and sending a binding acknowledgement as discussed above. As a result all of the encryption and authentication steps are carried out at the pseudo correspondent node 50. Once return routability (RR) has been set up in block 166 then the mobile node 26 may send a binding update to the correspondent node 24, which will be intercepted by the pseudo-correspondent node 50 and inserted into the binding cache in block 168, and so the source address of a packet from a mobile node to a pseudo-correspondent node can be compared against the binding cache and if found this indicates communication with a mobile node.

Likewise the destination address of a packet from a correspondent node 24 in block 170 can be compared against the binding cache in block 172, and if found this indicates communication with a mobile node.

Once correspondence with a mobile node 26 has been established and the binding cache updated the pseudo correspondent node 50 can then forward further traffic from the mobile node 26 to the correspondent node 24 by identifying relevant traffic from the binding cache in block 174 and intercepting the traffic at block 176. By replacing the care-of address with the home address of the mobile node 26 in the source field, in block 178 the mobility option is effectively stripped out and the message is forwarded to the correspondent node 24 at block 180 which can deal with communications under normal protocols.

When the correspondent node 24 returns a packet in block 170 this will, therefore, have the home address of the mobile node 26 as destination address which is monitored by the pseudo correspondent node 50 at block 172. Accordingly it is also necessary for the pseudo correspondent node 50 to intercept such traffic from the correspondent node 24 in block 181 in order to ensure that the mobility options are re-inserted, in particular by replacing the mobile node home address with the mobile node care-of address in the destination field in block 182, relying on the binding cache to obtain the correct values. It will be noted that the pseudo correspondent node 50 only needs to monitor traffic from correspondent nodes for which a binding cache entry already exists which can be indexed by the destination address of the correspondent node originating packet. It will be recognized that correspondence between non-mobile node hosts and the correspondent node 24, or indeed mobile nodes 26, not participating in route optimisation in block 184, can correspond with the correspondent node 24 as normal, as the pseudo correspondent node 50 will regard such traffic as normal traffic and route it accordingly in block 186.

Once route optimisation has been implemented in block 166, packets from the mobile node 26 will include a home address option as discussed above, comprising the mobile nodes' home address. As a result the pseudo correspondent node 50 can identify, process and forward such packets very easily. In particular once the home address option is validated at the pseudo correspondent node 50 it can simply swap the source address and the home address option and forward the packet with the home address as source address to the correspondent node. The home address option is removed from the packet or set as padding in block 188 as otherwise the correspondent node 24 may recognize the packet as including mobility options.

Similarly, when the pseudo correspondent node 50 processes a packet from the correspondent node 24 to the mobile node 26, the address replacement is easily processed. In particular, in block 190 the pseudo correspondent node 50 inserts a Type 2 routing header into the packet. This header type is a mobile option supported in mobile IPv6 restricted, for security reasons, to carrying only one address. The destination of the packet forwarded by the correspondent node is set to the care-of address and the home address is contained in the routing header. As a result when the mobile node 26 receives it, it can process the routing header and deal with the packet appropriately. In the example discussed here, if a mobile node 26 sends a packet to the correspondent node 24 using its home address and without a home address option then the pseudo correspondent node 50 will forward this as normal traffic to the correspondent node 24. However on reply the pseudo correspondent node 50 will still recognize the return packet as one destined for a mobile node 26 for which there is an entry in the binding cache and inserts a Type 2 routing header into the packet so that the packet is sent directly to the mobile node 26 in block 192 rather than via the home agent 20. If the mobile node 26 wishes to suspend route optimisation it must instruct the pseudo correspondent node 50 to de-register the binding cache entry.

The pseudo correspondent node may act for one or more correspondent nodes. In the latter case it must be notified of which correspondent nodes it acts as pseudo correspondent node for, by maintaining a list of correspondent node addresses. On the basis of this it can ensure interception of all relevant packets from supported correspondent nodes.

The last hop router can act as a pseudo correspondent node 50 and carry out all of the steps that would otherwise be carried out directly by the correspondent node 24, however the processing and memory burdens are shifted as discussed above. Upper check layer check sums do not need to be updated when the home address option or routing header are processed since the check sum is always calculated on a real address, not on the care-of address.

It will be appreciated that the steps above can be implemented in any appropriate manner by the skilled person for example by installing appropriate code into the router code as discussed in more detail below.

4.0 Implementation Mechanisms—Hardware Overview

Figure 9:
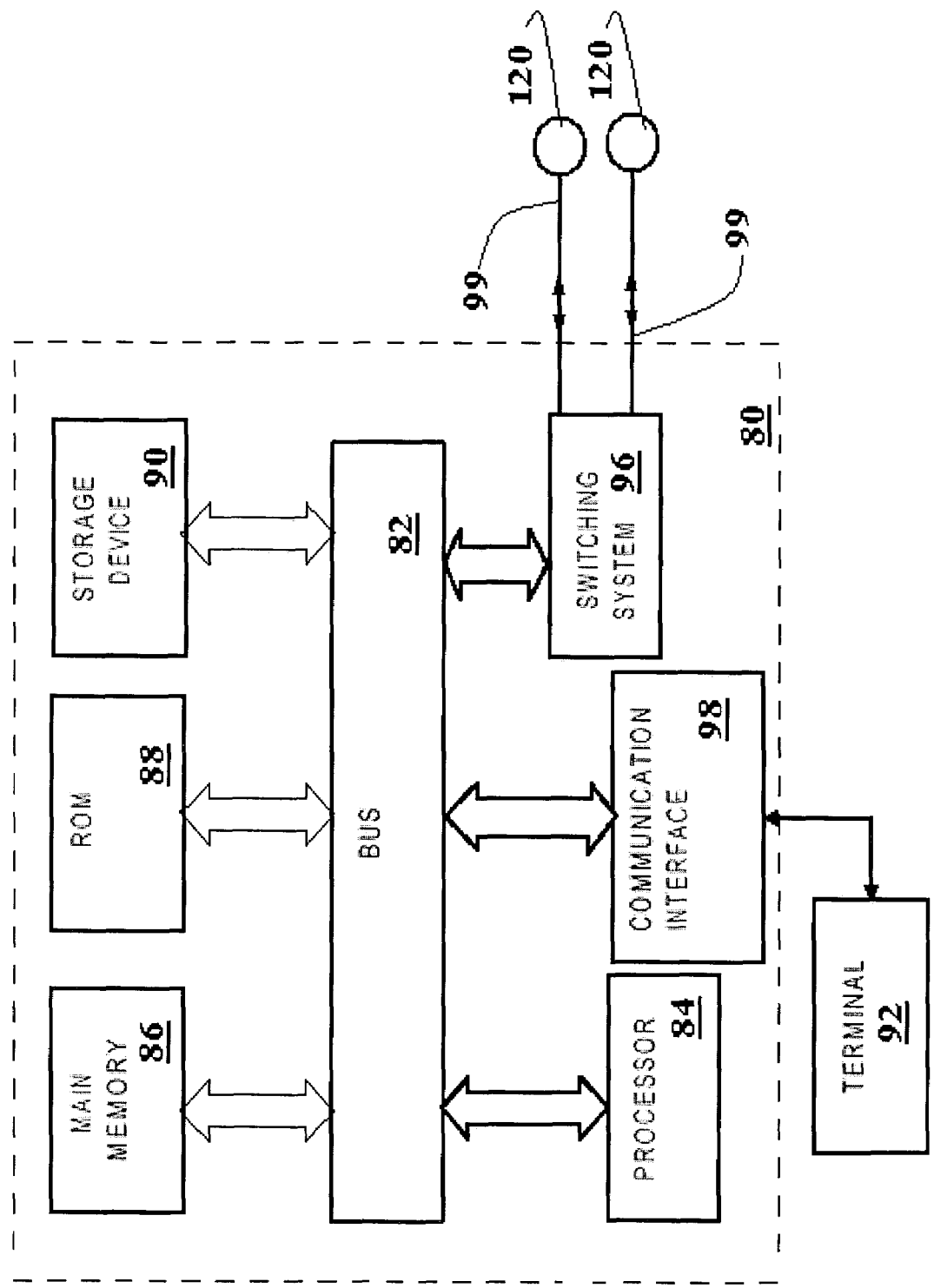
FIG. 9 is a block diagram that illustrates a computer system upon which an embodiment may be implemented.

FIG. 9 is a block diagram that illustrates a computer system 80 upon which an embodiment may be implemented. The embodiment is implemented using one or more computer programs running on a network element such as a router device. Thus, in this embodiment, the computer system 80 is a router.

Computer system 80 includes a bus 82 or other communication mechanism for communicating information, and a processor 84 coupled with bus 82 for processing information. Computer system 80 also includes a main memory 86, such as a random access memory (RAM), flash memory, or other dynamic storage device, coupled to bus 82 for storing information and instructions to be executed by processor 84. Main memory 86 also may be used for storing temporary variables or other intermediate information during execution of instructions to be executed by processor 84. Computer system 80 further includes a read only memory (ROM) 88 or other static storage device coupled to bus 82 for storing static information and instructions for processor 84. A storage device 90, such as a magnetic disk, flash memory or optical disk, is provided and coupled to bus 82 for storing information and instructions.

A communication interface 98 may be coupled to bus 82 for communicating information and command selections to processor 84. Interface 98 is a conventional serial interface such as an RS-232 or RS-422 interface. An external terminal 92 or other computer system connects to the computer system 80 and provides commands to it using the interface 98. Firmware or software running in the computer system 80 provides a terminal interface or character-based command interface so that external commands can be given to the computer system.

A switching system 96 is coupled to bus 82 and has an input interface and a respective output interface (commonly designated 99) to external network elements. The external network elements may include a plurality of additional routers 120 or a local network coupled to one or more hosts or routers, or a global network such as the Internet having one or more servers. The switching system 96 switches information traffic arriving on the input interface to output interface 99 according to pre-determined protocols and conventions that are well known. For example, switching system 96, in cooperation with processor 84, can determine a destination of a packet of data arriving on the input interface and send it to the correct destination using the output interface. The destinations may include a host, server, other end stations, or other routing and switching devices in a local network or Internet.

The computer system 80 implements as a router acting as a pseudo correspondent node the above described method of processing data traffic. The implementation in the present example is provided by computer system 80 in response to processor 84 executing one or more sequences of one or more instructions contained in main memory 86. Such instructions may be read into main memory 86 from another computer-readable medium, such as storage device 90. Execution of the sequences of instructions contained in main memory 86 causes processor 84 to perform the process steps described herein. One or more processors in a multi-processing arrangement may also be employed to execute the sequences of instructions contained in main memory 86. In alternative embodiments, hard-wired circuitry may be used in place of or in combination with software instructions to implement the method. Thus, the method is not limited to any specific combination of hardware circuitry and software.

The term "computer-readable medium" as used herein refers to any medium that participates in providing instructions to processor 84 for execution. Such a medium may take many forms, including but not limited to storage media (for example non-volatile media, volatile media), and transmission media. Non-volatile media includes, for example, optical or magnetic disks, such as storage device 90. Volatile media includes dynamic memory, such as main memory 86. Transmission media includes coaxial cables, copper wire and fiber optics, including the wires that comprise bus 82. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 84 for execution. For example, the instructions may initially be carried on a magnetic disk of a remote computer. The remote computer can load the instructions into its dynamic memory and send the instructions over a telephone line using a modem. A modem local to computer system 80 can receive the data on the telephone line and use an infrared transmitter to convert the data to an infrared signal. An infrared detector coupled to bus 82 can receive the data carried in the infrared signal and place the data on bus 82. Bus 82 carries the data to main memory 86, from which processor 84 retrieves and executes the instructions. The instructions received by main memory 86 may optionally be stored on storage device 90 either before or after execution by processor 84.

Interface 99 also provides a two-way data communication coupling to a network link that is connected to a local network. For example, the interface 99 may be an integrated services digital network (ISDN) card or a modem to provide a data communication connection to a corresponding type of telephone line. As another example, the interface 99 may be a local area network (LAN) card to provide a data communication connection to a compatible LAN. Wireless links may also be implemented. In any such implementation, the interface 99 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP).

The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through interface 99, which carry the digital data to and from computer system 80, are exemplary forms of carrier waves transporting the information.

Computer system 80 can send messages and receive data, including program code, through the network(s), network link and interface 99. In the Internet example, a server might transmit a requested code for an application program through the Internet, ISP, local network and communication interface 98. One such downloaded application provides for the method as described herein.

The received code may be executed by processor 84 as it is received, and/or stored in storage device 90, or other non-volatile storage for later execution. In this manner, computer system 80 may obtain application code in the form of a carrier wave.

5.0 Extensions and Alternatives

The method steps set out can be carried out in any appropriate order and aspects from the examples and embodiments described juxtaposed or interchanged as appropriate. It will be appreciated that a router can act as a pseudo correspondent node, intercepting packets for a number of correspondent nodes and compressing common data in the binding cache so as to economize on memory space. Although the specific discussion above is directed to mobile IPv6 any appropriate protocol supporting mobility options can equally form the basis of the method. Although the pseudo correspondent node is presented as the last hop router it will be appreciated that, dependent on the routing protocol, it can be another router although this could require tunneling or source routing from the correspondent node to the pseudo correspondent node to ensure that all relevant data traffic is intercepted.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing data traffic across a data communication network between a correspondent node and a mobile node having a home address attachable to a plurality of points on the data communication network to provide respective attachment addresses, comprising the steps of:

at a pseudo-correspondent node:

intercepting traffic from the correspondent node destined to the mobile node and replacing the home address with the attachment address in a destination address of the traffic;

wherein replacing the home address with the attachment address comprises removing the home address from the destination address of the traffic and inserting the attachment address in the destination address of the traffic; and intercepting traffic from the mobile node destined to the correspondent node and replacing the attachment address with the home address in a source address of the traffic;

wherein replacing the attachment address with the home address comprises removing the attachment address from the source address of the traffic and inserting the home address in the source address of the traffic.

2. A method as claimed in claim 1, in which a router in the network intercepts said traffic and replaces said addresses.

3. A method as claimed in claim 2, in which the router is the last hop router to the correspondent node.

4. A method as claimed in claim 1, further comprising the step of:

constructing and storing a binding table of correspondent nodes and mobile nodes.

5. A method as claimed in claim 1, comprising the steps of intercepting traffic and replacing addresses for a plurality of correspondent nodes.

6. A method as claimed in claim 5, further comprising the step of compressing duplicated information between correspondent nodes on a binding table of correspondent nodes and mobile nodes.

7. A method as claimed in claim 1, in which the step of replacing the attachment address as source with the home address further comprises the step of deriving the home address from a home address option in the data traffic packet.

8. A method as claimed in claim 1 further comprising the step, when the home address is replaced as destination with the attachment address, of retaining the home address in the data traffic in a routing header.

9. A method as claimed in claim 8 in which the routing header is a Type routing header.

10. Logic encoded in one or more readable storage media for processing data traffic across a data communication network between a correspondent node and a mobile node having a home address attachable to a plurality of points on the data communication network to provide respective attachment addresses, which logic when executed is operable to:

intercept traffic from the correspondent node destined to the mobile node and replace the home address with the attachment address in a destination address of the traffic;

wherein the logic operable to replace the home address with the attachment address comprises logic that is operable to remove the home address from the destination address of the traffic and to insert the attachment address in the destination address of the traffic; and intercept traffic from the mobile node destined to the correspondent node and replace the attachment address with the home address in a source address of the traffic;

wherein the logic operable to replace the attachment address with the home address comprises logic that is operable to remove the attachment address from the source address of the traffic and to insert the home address in the source address of the traffic;

wherein the logic is configurable as a pseudo-correspondent node.

11. The media of claim 10, wherein the logic is stored in a router that is operable to process data traffic in the data communication network.

12. The media of claim 11, wherein the router is the last hop router to the correspondent node.

13. The media of claim 10, wherein the logic further comprises logic which, when executed, is operable to construct and store a binding table of correspondent nodes and mobile nodes.

14. The media of claim 10, wherein the logic further comprises logic which, when executed, is operable to intercept traffic and replace addresses for a plurality of correspondent nodes.

15. The media of claim 14, wherein the logic further comprises logic which, when executed, is operable to compress duplicated information between correspondent nodes on a binding table of correspondent nodes and mobile nodes.

16. The media of claim 10, wherein the logic operable to replace the attachment address with the home address further comprises logic which, when executed, is operable to derive the home address from a home address option in data traffic packets.

17. The media of claim 10, wherein the logic further comprises logic which, when executed, is operable to retain the home address in the data traffic in a routing header when the home address is replaced as destination with the attachment address.

18. The media of claim 17, wherein the routing header is a Type 2 routing header.

19. An apparatus for processing data traffic across a data communication network between a correspondent node and a mobile node having a home address attachable to a plurality of points on the data communication network to provide respective attachment addresses, comprising:
   means for intercepting traffic from the correspondent node destined to the mobile node and replacing the home address as destination with the attachment address;
   wherein the means for replacing the home address with the attachment address comprise means for removing the home address as the destination from the traffic and means for inserting the attachment address as the destination in the traffic; and
   means for intercepting traffic from the mobile node destined to the correspondent node and replacing the attachment address as source with the home address;
   wherein the means for replacing the attachment address with the home address comprise means for removing the attachment address as the source from the traffic and means for inserting the home address as the source in the traffic;
   wherein the apparatus is configurable as a pseudo-correspondent node.

20. An apparatus as claimed in claim 19, in which a router in the network includes means for intercepting said traffic and replacing said addresses.

21. An apparatus as claimed in claim 20, in which the router is the last hop router to the correspondent node.

22. An apparatus as claimed in claim 19 further comprising means for constructing and storing a binding table of correspondent nodes and mobile nodes.

23. An apparatus as claimed in claim 19, further comprising means for intercepting traffic and replacing addresses for a plurality of correspondent nodes.

24. An apparatus as claimed in claim 23, further comprising means for compressing duplicated information between correspondent nodes on a binding table of correspondent modes and mobile nodes.

25. An apparatus as claimed in claim 19, in which the means for replacing the attachment address as source with the home address further comprises means for deriving the home address from a home address option in the data traffic packet.

26. An apparatus as claimed in claim 19 further comprising means, when the home address is replaced as destination with the attachment address, for retaining the home address in the data traffic in a routing header.

27. An apparatus as claimed in claim 26 in which the routing header is a Type 2 routing header.

28. An apparatus for processing data traffic across a data communication network between a correspondent node and a mobile node having a home address attachable to a plurality of points on the data communication network to provide respective attachment addresses, the apparatus comprising:
   one or more processors; and
   logic encoded in one or more readable media for execution and accessible to the one or more processors and when executed operable to:
      intercept traffic from the correspondent node destined to the mobile node and replace the home address with the attachment address in a destination address of the traffic;
      wherein the logic operable to replace the home address with the attachment address comprises logic that is operable to remove the home address from the destination address of the traffic and to insert the attachment address in the destination address of the traffic; and
      intercept traffic from the mobile node destined to the correspondent node and replace the attachment address with the home address in a source address of the traffic;
      wherein the logic operable to replace the attachment address with the home address comprises logic that is operable to remove the attachment address from the source address of the traffic and to insert the home address in the source address of the traffic;
      wherein the logic is configurable as a pseudo-correspondent node.

29. The apparatus of claim 28, wherein the apparatus is included in a router that is operable to process data traffic in the data communication network.

30. The apparatus of claim 29, wherein the router is the last hop router to the correspondent node.

31. The apparatus of claim 28, wherein the logic further comprises logic which, when executed, is operable to construct and store a binding table of correspondent nodes and mobile nodes.

32. The apparatus of claim 28, wherein the logic further comprises logic which, when executed, is operable to intercept traffic and replace addresses for a plurality of correspondent nodes.

33. The apparatus of claim 32, wherein the logic further comprises logic which, when executed, is operable to compress duplicated information between correspondent nodes on a binding table of correspondent nodes and mobile nodes.

34. The apparatus of claim 28, wherein the logic operable to replace the attachment address with the home address further comprises logic which, when executed, is operable to derive the home address from a home address option in data traffic packets.

35. The apparatus of claim 28, wherein the logic further comprises logic which, when executed, is operable to retain the home address in the data traffic in a routing header when the home address is replaced as destination with the attachment address.

36. The apparatus of claim 35, wherein the routing header is a Type 2 routing header.

37. An apparatus for processing data traffic across a data communication network between a correspondent node and a mobile node having a home address attachable to a plurality of points on the data communication network to provide respective attachment addresses, the apparatus comprising:
one or more processors; and
logic that is configurable as a pseudo-correspondent node, wherein the logic is encoded in one or more readable media for execution and is accessible to the one or more processors, and wherein when executed the logic is operable to:
maintain a cache in which the home address of the mobile node is associated with an attachment address of the mobile node;
intercept traffic from the correspondent node destined to the mobile node and replace the home address with the attachment address in a destination address field of the traffic, wherein the logic operable to replace the home address with the attachment address comprises logic operable to:
inspect the cache to determine the attachment address;
remove the home address from the destination address field of the traffic; and
insert the attachment address in the destination address field of the traffic;
intercept traffic from the mobile node destined to the correspondent node and replace the attachment address with the home address in a source address field of the traffic, wherein the logic operable to replace the attachment address with the home address comprises logic operable to:
inspect the cache to determine the home address;
remove the attachment address from the source address field of the traffic; and
insert the home address in the source address field of the traffic.

38. The apparatus of claim 37, wherein the logic further comprises logic which, when executed, is operable to intercept traffic and replace addresses for a plurality of correspondent nodes.

39. The apparatus of claim 37, wherein the logic operable to replace the attachment address with the home address further comprises logic which, when executed, is operable to derive the home address from a home address option field included in packets that comprise the traffic.

40. The apparatus of claim 37, wherein the logic further comprises logic which, when executed, is operable to retain the home address in a routing header included in packets of the traffic when the home address is replaced with the attachment address, wherein the routing header is a Type 2 routing header.

* * * * *